(12) United States Patent
Guenther et al.

(10) Patent No.: US 8,615,683 B2
(45) Date of Patent: Dec. 24, 2013

(54) CAPTURING DATA DURING OPERATION OF AN INDUSTRIAL CONTROLLER FOR THE DEBUGGING OF CONTROL PROGRAMS

(75) Inventors: Robert Guenther, Linden (DE); Steven A. Zuponcic, Solon, OH (US); Kenwood H. Hall, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 360 days.

(21) Appl. No.: 13/168,236

(22) Filed: Jun. 24, 2011

(65) Prior Publication Data

US 2012/0330452 A1 Dec. 27, 2012

(51) Int. Cl.
*G06F 11/00* (2006.01)
(52) U.S. Cl.
USPC .......................................... 714/38.1
(58) Field of Classification Search
USPC ........... 714/18, 20, 25, 26, 28, 30, 31, 33, 35, 714/37, 38.1, 39, 48, 49
See application file for complete search history.

(56) References Cited

U.S. PATENT DOCUMENTS

| | | | |
|---|---|---|---|
| 6,201,996 B1 * | 3/2001 | Crater et al. | 700/9 |
| 7,076,311 B2 * | 7/2006 | Schuster | 700/21 |
| 7,203,575 B2 | 4/2007 | Maturana | |
| 7,266,426 B2 * | 9/2007 | Maturana et al. | 700/282 |
| 7,340,574 B2 | 3/2008 | Hall et al. | |
| 7,424,327 B2 * | 9/2008 | Grgic et al. | 700/9 |
| 7,539,724 B1 * | 5/2009 | Callaghan | 709/205 |
| 7,571,349 B2 * | 8/2009 | Levidow et al. | 714/15 |
| 7,640,291 B2 | 12/2009 | Maturana et al. | |
| 8,468,501 B2 * | 6/2013 | Subhraveti | 717/125 |
| 2011/0029812 A1 * | 2/2011 | Lu et al. | 714/18 |

OTHER PUBLICATIONS

Rockwell Automation, Design & Configuration RSLogix 5000 Overview article, http://www.rockwellautomation.com/rockwellsoftware/design/rslogix5000, May 5, 2011.

(Continued)

*Primary Examiner* — Nadeem Iqbal
(74) *Attorney, Agent, or Firm* — R. Scott Speroff; Boyle Fredrickson, S.C.; John M. Miller

(57) ABSTRACT

An industrial controller module (13a) is provided with a routine of program instructions (29a) for storing a log of I/O table state changes (31) in a defined portion of memory (23). Upon the occurrence of a trigger event, a file of the state changes (37) is saved in the memory (23). Each entry (32) in the log of I/O table state changes (31) includes a timestamp (33) and values of each word of I/O state data (36) that changed at a time of the timestamp. Logs of state change data (16a), including timestamp data, can also be saved for intelligent sensors and actuators (16) and uploaded with the log of controller processor state data (31) to a computer (20) with a diagnostic program (21a) for playing back the state changes and synchronizing changes of the intelligent sensors and actuators (16) with changes of the controller processor module (13a).

12 Claims, 2 Drawing Sheets

(56) References Cited

OTHER PUBLICATIONS

Rockwell Automation, Design & Confirguration RSLogix Emulate, Overview and System Requirements & Compatibility articles, http://www.rockwellautomation.com/rockwellsoftware/design/rslogixemulate, May 5, 2011.

Rockwell Automation, Optimize Productivity with RSLogix 5000 Design and Configuration Software, http://www.rockwellsoftware/design/rslogix5000/benefits.html, May 2011.

Rockwell Automation, Logix5000 Controllers Nonvolatile Memory Card, Rockwell Automation Publication 1756-PM017D-EN-P, Sep. 2010, pp. 1-31.

\* cited by examiner

CAPTURING DATA DURING OPERATION OF AN INDUSTRIAL CONTROLLER FOR THE DEBUGGING OF CONTROL PROGRAMS

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to controllers for controlling a machine, a collection of devices on a production line or various types of industrial processes.

Industrial controllers are special purpose computers used for controlling industrial processes and manufacturing equipment on a real-time basis. These controllers include programmable logic controllers using ladder diagram programs and machine control I/O devices and process controllers using function chart symbolic language and complex analog/digital I/O or a combination of these.

Under the direction of a user-language application program, the industrial controller examines the state of inputs reflecting the state of the controlled process and sets the state of the outputs controlling the controlled process. During operation, those inputs and outputs can be graphically displayed using a human machine interface (HMI) in the form of process animation, logic ladder, data values, or similar construct to provide real-time or "live" monitoring of the industrial process. An operator, such as a process engineer, may then perform any diagnostic or debugging assessments on this "live" data.

Conventional HMI's are designed to process only real-time values that are received from the industrial controller processor. In order for a process engineer to assess the industrial process using the monitoring tools provided by the HMI, such as ladder logic and process animation, simulated data values for the industrial process must be created using a model of the industrial process and input to the HMI for processing. To debug the industrial process, or portion thereof, the process engineer must either debug a simulation of the industrial process or manually create values that are believed to be consistent with those provided during the industrial process. However, this modeled data may not reveal the problem with the actual industrial process which may deviate from the idealized model.

In contrast, historian services have been implemented in industrial control applications to acquire time-series data during cycles of the industrial process for retroactive analysis. Generally, historian services collect and store the data that is fed to the HMI. The data is stored in a database that arranges the data based on the time at which it was acquired. This time-ordered data thereby provides a historical perspective of the industrial process that can be used to generate trending reports, charts, graphs, and the like.

Industrial controller systems may be spread out in numerous devices such as controllers, HMIs, and intelligent actuators and sensors. The state of these I/O devices must be considered as well as the state of the central controller processor in determining the overall state of the controller. Errors in the operation of industrial controller systems can be caused by dynamic variables such as the speed of operation. Errors in the operation of industrial controller systems can also be intermittent and difficult to reproduce.

Capturing all of the I/O data associated with even a moderately complex industrial control system can be difficult or impractical both because of the large amount of data storage required and the necessary bandwidth of the data acquisition system needed to collect high resolution data samples with high precision.

BRIEF SUMMARY OF THE INVENTION

The invention provides for saving a log of I/O state data for diagnostics and for correction of industrial control application programs.

Each state change includes a timestamp for the state change; an address of a controller program instruction making the state change, an address of at least one word of I/O state data that has changed through execution of the controller program instruction, and values of the I/O state data that changed at the time of the state change. Because only changed I/O data is saved, the prior state of the I/O data is available in one of the other entries in the log of I/O state data. During playback, the saved log of I/O state data can be stepped through in either in a forward direction in time or in a reverse direction in time and in a step-by-step progression or skipping steps using the time stamp data associated with the steps.

The invention provides a routine of machine code instructions in the controller processor to save a file of state change data upon a trigger event. The trigger event can originate from one of several sources including: spontaneously from detection of an operational error, from a manual input from a human technician or from a program instruction in the user-language control program.

State changes are collected only for times when the I/O data has changed its state or value. Since each state change is time stamped, the time between changes is provided during diagnostics. This saves memory space and review time by not saving data having no changes.

Logs of I/O data can also be collected on intelligent I/O devices and collected at a programming computer for contemporaneous review with log from the controller processor, using time stamps for synchronization of the data.

The foregoing and other aspects of the invention will appear from the following description. In the description, reference is made to the accompanying drawings, which form a part hereof, and in which there is shown by way of illustration a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
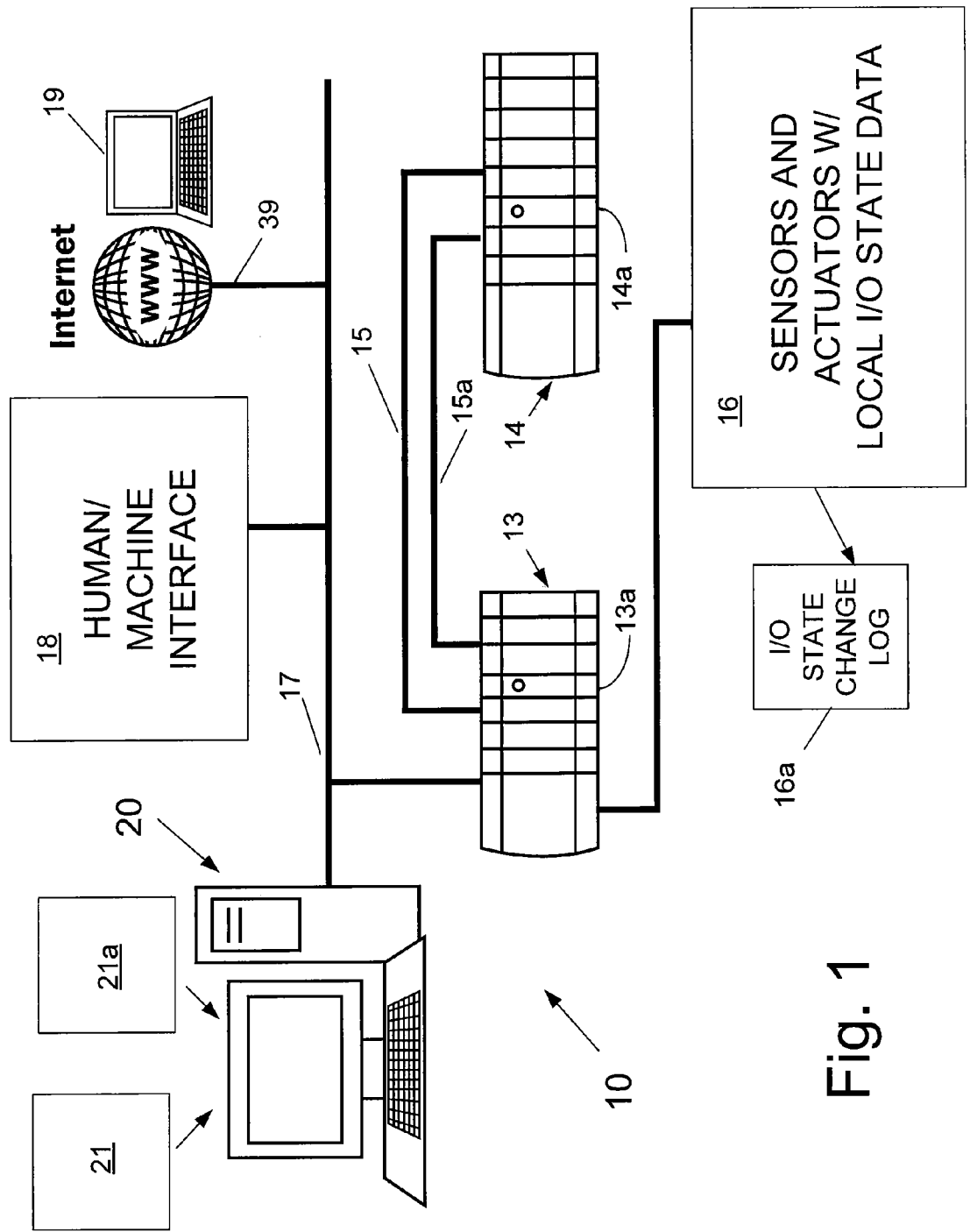
FIG. 1 is a block diagram of a networked industrial control system incorporating the present invention.

Referring to FIG. 1, in a preferred embodiment of the invention, an industrial control system 10 includes a primary industrial controller 13 and secondary controller 14 each assembled with other modules in respective equipment rack. In this embodiment, the controllers are those offered under the trade designation "ControlLogix® 1756," by the assignee herein, but in other embodiments these could be controllers offered under the trade designations, "CompactLogix®," FlexLogix®" "SoftLogix®" or "DriveLogix®." Each controller 13, 14, includes a respective processor module 13a and 14a, respectively, to be described in greater detail below. The controllers 13, 14, may communicate with each other through a network 15 offered under the trademark "ControlNet" by the assignee of the present invention. A synchronization communication link 15a is provided for communications to synchronize operation of the controller processor modules 13a, 14a in a redundancy or back-up mode, for example. The controller 11 is connected through a device level network of a type known in the art to a plurality of intelligent sensors and actuators 16 having their own local I/O state data. By "intelligent," it is meant that these sensors and actuators 16 include at least one microelectronic processor and execute machine code instructions in carrying out their control functions and communicating with the controller processor module 13a, 14a. Such intelligent sensors and actuators are embodied in motion control I/O modules and other types of peripheral processor I/O modules in the controller system 10.

The controllers 13, 14 also communicate through an Ethernet/Internet Protocol network 17 to various devices for programming and viewing operation of the industrial control system. A human/machine interface 18 communicates over network 17 to the controllers 13, 14. The human/machine interface 18 includes a screen display and can also include emergency stop push buttons, a key pad and a touch screen. A laptop computer 19 is interfaced to the network 17 through the Internet 18 and equipped with an Internet Browser and application software can also be used to perform these functions.

A programming computer 20 is also connected to the Ethernet/Internet Protocol network 17. The programming computer 20 is a computer meeting the published specifications of the assignee, which are hereby incorporated by reference, for running an RSLogix™ 5000 Enterprise Series software application program 21. The Enterprise program 21 provides for authoring a controller application program 27 represented in FIG. 2. The application program 27 is authored in a symbolic user-recognizable program language using symbols such as relay ladder logic symbols, function block diagram symbols and sequential function chart diagram symbols, for example. These programs 27 are authored, edited and then downloaded and uploaded over the Ethernet/Internet Protocol network 17 to and from the controller processors 13a, 14a. In the art, these controller application programs are also referred to "user control programs."

Figure 2:
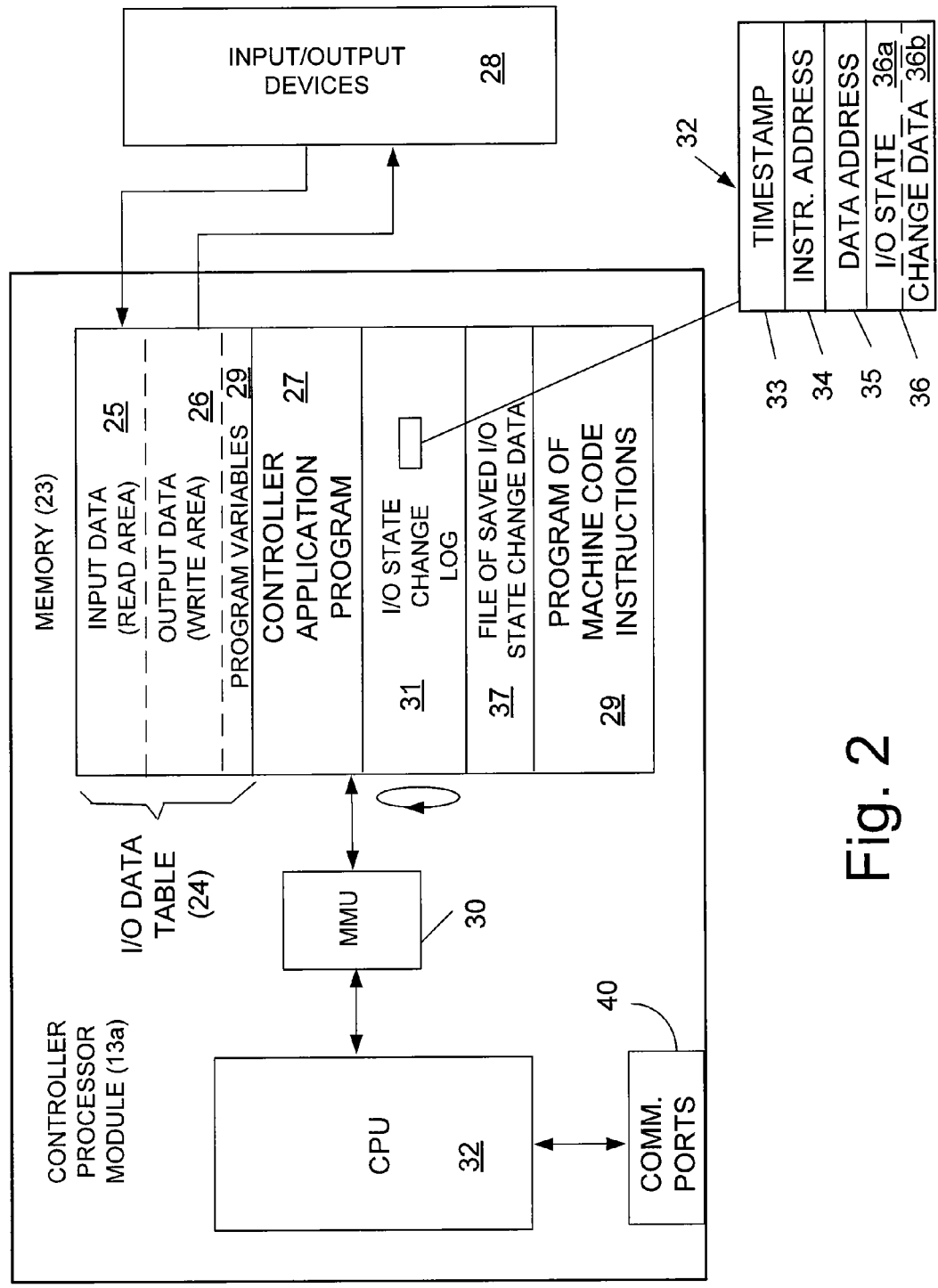
FIG. 2 is a more detailed block diagram of a controller processor module from FIG. 1 that also incorporates the present invention.

Referring now to FIG. 2, a block diagram of the controller processor modules 13a is provided. The elements described in FIG. 2 would also be found in the synchronized controller processor module 14a. The controller processor module 13a includes a microelectronic CPU 22 for executing machine language program instructions to control operations of their respective controllers 13, 14, and to communicate on the networks. The term "CPU" means "central processing unit," and the term processor will also be used herein to refer to the CPU 22. Each controller processor module 13a, 14a can utilize various types of memory, including both RAM and nonvolatile memory such as compact flash memory or secure digital (SD) memory provided on an additional memory card, all of these are included within the term "non-transitory medium." The representation of memory 23 in FIG. 2 is a schematic only and it will be understood by one of ordinary skill in the art, that the various types of data and program instructions may be stored in different physical memory circuits of different types and technologies, e.g., volatile and non-volatile memory.

Certain items shown stored in memory 23 are well known in the art of industrial controllers. The I/O data table 24 holds I/O state data including a read area 25 storing input data received from input devices, such as sensors and switches, and a write area 26 storing output data to be transmitted to output devices, such as switches and actuators. The input devices, output devices and devices having both inputs and outputs are represented collectively by block 28 in FIG. 2. A user control program 27 of the type described above is stored in memory and executed by the CPU 22 to analyze the state of inputs on a controlled machine or process and to set the state of the outputs on the controlled machine or process according to the logic contained in the program instructions. In executing this user control program 27, the instructions from the user programming language have been, or are, converted to machine code instructions that are recognized by the CPU 22. Also stored in memory is a program of machine code instructions 29, which are a plurality of machine language instructions providing the operating system for the controller processor module 13a, 14a, as well as instructions for communicating over the various networks discussed above.

Still referring to FIG. 2, as is known in the art, a memory management unit 30 is typically used to translate virtual memory addresses to actual physical memory addresses in the memory 23. A sequential group of virtual addresses may not be stored in contiguous fashion within the memory 23. The machine code program 29 utilizes a memory management unit (MMU) 30 to define a relationship between the virtual addresses and physical memory addresses. When a virtual address is received by the MMU 30, it converts the virtual address to the actual physical memory address that is being accessed.

Another function of the MMU 30 is to allow different regions, such as pages, of the memory 23 to be configured as read/write or read-only (write-protected), depending on its particular use. This will protect data in both the input table and output table from being changed. The protection information is also stored with the virtual to physical translation address coding information in the memory management unit. The protection information for recently accessed pages is also stored in the MMU 30.

If a command is received that addresses a memory location that is designated as read-only, an abort condition is signaled and recognized by the CPU 22, which executes an abort handling group of instructions for handling the error condition.

The abort handling function is useful for recording a log of data changes in memory. The memory locations in the I/O data table, for example, can be initialized by instructions in the machine code program 29, as write-protected, and hence read-only in the MMU 30 with respect to operations of the CPU 22. If the CPU 22 executes an instruction to write data to a write-protected portion of the I/O data table 24 in memory 23, an abort condition will be signaled to the CPU 22. The CPU 22 will then execute machine code instructions contained in the program machine code program 29.

Prior to executing these instructions, the CPU 22 executes at least one machine code instruction to initialize at least a portion of the I/O data table 24 as write-protected (read-only). The abort handling group of instructions are responsive to detection of an abort condition to receiving a controller program write instruction having a target address within a write-protected portion the I/O data table 24; and in response to the abort condition, writing a state change in the log portion of memory, and resetting the write-protected target address to permit access read/write access. Further details of the abort handling routine are described at col. 7, line 16 to col. 8, line 22, and are illustrated in FIG. 4 of U.S. Pat. No. 7,340,574, assigned to the assignee herein and incorporated herein by reference.

The repeated execution of abort handling routine of machine code instructions saves changed I/O data in a log of I/O state change data 31 while allowing update of the I/O data table 24 during execution of the controller application program 27. The I/O state change data is stored in a circular buffer portion of memory 23, meaning that once an entry is stored at the last address in the buffer, state change data at the first address in the log 31 will be overwritten to store the next entry. The data that is saved in the I/O state change log 31 is illustrated in the detail data map 32 in FIG. 2. Each entry 32 comprises: a timestamp 33 for the data entry 32, an address of a controller program instruction making the state change 34, an address 35 of at least one word of output data in the I/O data table 24 that has changed through execution of the controller program instruction, and value of any word or words of I/O state change data 36 (including input state data) that have changed at the time of the timestamp. The I/O state change data 36 can include an alphanumeric label to identify each word of I/O data as well as a numeric value. It is possible for both input state data and output state data to change at any instant in time. Because only changed I/O data is saved, the prior state of the I/O data is available in one of the other entries in log of I/O state data 31. The I/O data that is saved in the log 31, is limited to I/O state data representing the state of I/O modules or I/O devices that are external to the controller processor 13a. The I/O data that is saved in the log 31 does not include status data which is changed through execution of the controller application program 27, but is only internal to the application program and the controller processor 13a.

The state change log 31 is saved to a separate file storage area 37 upon a trigger event. The trigger event can be any one of: a manual trigger input from a human operator; an error in controller operation detected by the controller during operation; an execution of an instruction in the controller application program to provide the trigger event. The human/machine interface 18 can include emergency stop push buttons, a key pad or a touch screen, allowing an operator to make a manual input to initiate saving of the state change log. The trigger event can be an error detected in executing the control program, such as by sensing the state of a limit switch that is normally not operated. The trigger event could also be initiated by execution of an instruction in the controller application program such as a "Stop Error Trace" instruction into any rung of a ladder diagram that reports a machine fault to the operator.

The trigger event causes a plurality of machine code program instructions to be executed for saving the current state change log 31 in a separate area in memory 37. The machine code program 29 includes further instructions for saving some number of additional I/O data state changes after the trigger event. This can be pre-programmed in the machine code program 29 or made a configurable number for initialization instructions in the controller application program 27.

The machine code program 29 including the abort handling routine of instructions, allows the industrial controller to execute instructions in the controller application program to control a machine or process as the log of state changes in the table of I/O state data is being updated and then saved in response to the trigger condition.

The memory space allocated to the I/O state change log 31 can be selected by memory address space and size by the user through memory configuration instructions in the user application program.

The intelligent sensors and actuators 16 can also be programmed to configure memory to provide an I/O state change log 16a (FIG. 1) for recording data upon a trigger event. The state data entries in state change log 16a each also include a timestamp for the state change log, a reference to a controller program instruction making the state change, an address of at least one word of I/O state data in a local I/O data table that has changed through execution of the controller program instruction, and values of the words of I/O state data that have changed at the time of the timestamp. The intelligent sensors and actuators 16 are also programmed for transferring a file containing the state data log upstream to the programming computer 20 for diagnostics analysis. The controller processor modules 13a, 14a each include communication ports 40 for communicating over the various networks seen in FIG. 1. The time stamped data from the sensors and actuators can be coordinated in time with execution of instructions at the controller processor module 13a, and a better view of the state of the system can be provided.

The computer 20 is provided with a diagnostics program 21a including playback functions as described in a copending application of the inventors, herein, entitled "Troubleshooting System for Industrial Control Programs," filed on even date herewith and assigned to the assignee herein. The disclosure therein is hereby incorporated by reference for describing and illustrating how the log of I/O state data changes that are recorded with the present invention and later utilized to find operational errors and correct them through programming changes in the controller application program 27 in an offline location. It also anticipated that such programming and diagnostics applications 21, 21a could be executed on a laptop computer such as computer 19 shown in FIG. 1.

This has been a description of a preferred embodiment of the invention with alternatives and modifications. It will be apparent that various additional modifications and details can be varied without departing from the scope and spirit of the invention, and these are intended to come within the scope of the following claims.

We claim:

1. An industrial controller module for diagnosis and correction of error conditions in operation of the industrial controller, the module comprising:
a processor for executing machine language program instructions;
a memory having an I/O data table for storing a table of I/O state data and having a log portion for storing a log of state changes during execution of a controller application program;
a plurality of machine code program instructions stored in a non-transitory medium for execution during execution of controller application program for saving in the log portion of memory the log of state changes in which each state change comprises: a timestamp for a state change in data in the I/O data table; an address of a controller program instruction making the state change, an address of at least one word of I/O state data in the I/O data table that has changed through execution of the controller program instruction, and values of the I/O state data at a time of the state change; and
upon a trigger event, said machine code program instructions being executable by said processor for saving a file including said log of state changes stored in memory at occurrence of the trigger event.

2. The industrial controller module of claim 1, wherein the trigger event results from at least one of:
- a manual trigger input from a human operator;
- an error in controller operation detected by the controller during operation; and
- an execution of an instruction in the controller application program to provide the trigger event.

3. The industrial controller module of claim 1, further comprising machine code instructions that are executed for saving additional state changes in the file of I/O state change data that has been saved upon the occurrence of a trigger event.

4. The industrial controller module of claim 3, wherein the industrial controller is programmed for concurrently executing instructions in a controller application program to control a machine, a production line or a process as the log of state changes in the table of I/O state data is being saved in the log portion of memory.

5. The industrial controller module of claim 1, further comprising means for communicating the log of I/O state changes to a programming computer for diagnosis and correction of error conditions in operation of the industrial controller.

6. The module of claim 1, wherein the industrial controller module is a controller processor module.

7. The industrial controller module of claim 1, wherein the industrial controller module is a processor-based sensor or actuator module.

8. A computer program stored in a non-transitory medium and executable for diagnosis and correction of error conditions in operation of an industrial controller, wherein the industrial controller includes a memory having an I/O data table for storing I/O state data, the computer program comprising:
- a data logging group of program instructions that are executed for storing in a log portion of memory a log of state changes comprising a plurality of changes in the data table portion, in which each state change comprises: a timestamp for the state change; an address of a controller program instruction making the state change, an address of a word of I/O state data that has changed through execution of the controller program instruction, and values of the I/O state data that have changed at a time of the timestamp; and
- upon a trigger event, said data logging group of program instructions are executable for saving a file of said log of state changes in memory at occurrence of the trigger event including the values that changed at occurrence of the trigger event.

9. The computer program of claim 8, wherein the trigger event results from at least one of:
- a manual trigger input from a human operator;
- an error in controller operation detected by the controller during operation; and
- an execution of an instruction in the controller application program to provide the trigger event.

10. The computer program of claim 8, further comprising machine code instructions that are executed for saving additional state change data in the file of state change data that has been saved upon the occurrence of a trigger event.

11. The computer program of claim 10, wherein execution of said the data logging group of program instructions allows continued execution of instructions in the controller application program to control a machine or process as the log of state changes in the table of I/O state data is being saved in the log portion of memory.

12. The computer program of claim 8, further comprising communication instructions for communicating the file of said log of state changes to a programming computer for diagnosis and correction of error conditions in operation of the industrial controller.

* * * * *